Patented Aug. 12, 1941

2,252,331

UNITED STATES PATENT OFFICE 2,252,331

BONDING MATERIAL AND PROCESS OF MAKING THE SAME

Claron R. Payne, Allentown, and Edward T. Severs, Mertztown, Pa., assignors to The Atlas Mineral Products Company, Mertztown, Pa., a corporation of Pennsylvania No Drawing. Application December 1, 1939, Serial No. 307,184

9 Claims. (Cl. 260—38)

This invention is a cement mortar containing a novel phenol-formaldehyde reaction product, and the process of producing said mortar.

One of the objects of the invention is to provide a cement mortar which at room temperature will be quickly converted to an infusible material. A further object is to provide a cement mortar which after setting, will be highly resistant to mild alkalies, and to acids with the exception of the highly oxidizing ones. A further object is to provide a cement mortar which contains a phenol-formaldehyde reaction product which is introduced into the mixture while the chemical constituents thereof are in a state of arrested chemical reaction.

The invention will be hereinafter fully set forth and particularly pointed out in the claims.

The methods of producing phenol-formaldehyde products are well known, although they are produced from various ratios of formaldehyde and phenol, and these two materials may be reacted in the presence of alkaline or acid catalysts. The product of the present invention is a reaction product of phenol and formaldehyde, or the homologues of these materials, initiated in any of the ways well known in the art. In practice, as the reaction progresses, there is first produced a liquid which, unless reaction is arrested, will increase in viscosity and will also become less and less soluble in ordinary solvents. Under the influence of heat, this material is finally converted into an infusible resin which is insoluble in most solvents.

For the purposes of the present invention, a reaction product is used, which may result during a phenol-formaldehyde reaction effected in any manner known and understood in the art, and is obtained by arresting the reaction at a stage where a liquid resinous material has been obtained, which is fairly viscous. The desired viscosity is determined in any desired manner known in the art. It is preferably measured in a Gardner and Holt tube, and the material has a viscosity of from 25 to 70 seconds at 25° C. The liquid material thus obtained is characterized by being insoluble in water, but readily soluble in glycerin or mixtures of glycerin and water. It is a resinous material which may be stored at temperatures below 65° F. for at least six months without any noticeable change in its properties of solubility or viscosity. However, if the material is stored at a temperature as high as 85° F., or is subjected to the same or a higher temperature, there is a noticeable gradual increase in its viscosity and a decrease in its solubility even in glycerin. In other words, at temperatures above 65° F. the arrested reaction is resumed and continues, so as to eventually produce the insoluble infusible resin. Therefore, it is important to arrest the reaction at the desired stage of liquid action and viscosity, and then to prevent further reaction by storing the product at some temperature below 65° F.

It has also been found that an excellent cement mortar is produced by a mixture of the liquid phenol-formaldehyde reaction product above described, glycerin and water used as a binder for an aggregate consisting of inert material and paratoluene sulphonic acid. Good results have been found by a mixture consisting of 75 parts by weight of liquid resin, 10 parts by weight of glycerin, and 15 parts by weight of water combined with a mixture of 85 to 96 parts by weight of inert material and 15 to 4 parts respectively, by weight of paratoluene sulphonic acid. Any desired inert material may be used, but it is preferred to employ silica or carbon of 50 to 325 mesh.

It is not definitely known just what takes place in the mixture, but apparently the glycerin enters into the reaction between the liquid resin and the paratoluene sulphonic acid, and it may react directly with the acid. However, a cement mortar consisting of the ingredients above defined becomes hard and infusible in about one hour at 70° F., and is highly resistant to mild alkalies, as well as to acids, with the exception of the highly oxidizing ones. Without the addition of these materials, the liquid resin may be stored at room temperature for months without being converted into the infusible state. In practice, the liquid resin, glycerin and water are mixed together and the mixture stored in a suitable container. The paratoluene sulphonic acid and the inert material are mixed and stored in another container. The two containers are shipped to the point where the mortar is to be used and are there mixed together in the desired quantities. Apparently there is no reaction between the resin, glycerin and water unless the paratoluene sulphonic acid is present.

The advantages of the invention will be readily apparent to those skilled in the art to which it belongs. For instance, it will be observed that the reaction product herein described and claimed may be produced in a very simple and inexpensive manner, and it may be stored for long periods for ready use to supply any and all demands.

It has been found that this mortar is particularly valuable for the jointing of brick in the lining of concrete, steel or wood tanks, which are filled with solutions of mild alkalies or solutions of all acids, with the exception of the highly oxidizing ones at temperatures up to 330° F. A further valuable use of the mortar is for the jointing of brick in the lining of concrete, steel or wood tanks used for recrystallization of salts from solutions. Because of low porosity of this cement, the salts cannot penetrate and recrystallize within the pores and thus cause disintegration, as is the case with other cements now in use. Another use of the mortar is for the jointing of brick in the lining of concrete, steel or wood tanks used for the neutralization of acids or alkalies, so that the solution is alternately acid and then alkaline. Sodium silicate cements, Portland cements and similar materials are disintegrated under these conditions, whereas the present cement is impervious to such action. In other words, the liquid phenol-formaldehyde reaction product of the present invention sets to a firm infusible material in less than one hour at 70° F., and is completely cured in twenty-four hours at 70°. It resists corrosive solutions at temperatures up to 330° F.

Having thus described our invention, what we claim as new and useful is:

1. A cement mortar comprising a binder consisting of a water-insoluble liquid phenol-formaldehyde reaction product in an arrested stage of its reaction, a solvent therefor consisting of glycerin and water, an aggregate, and para-toluene sulphonic acid, said mortar possessing the characteristic of setting to a firm infusible material at approximately room temperature.

2. A cement mortar comprising a binder consisting of a water-insoluble liquid phenol-formaldehyde reaction product in an arrested stage of its reaction and having the characteristic of remaining liquid at temperatures lower than room temperature, a solvent therefor consisting of glycerin and water, and an aggregate mixed with para-toluene sulphonic acid, said mortar possessing the characteristic of setting to a firm infusible material while exposed to the atmosphere at room temperature.

3. A cement mortar comprising a binder consisting of a water-insoluble liquid phenol-formaldehyde reaction product in an arrested stage of its reaction and possessing the characteristic of remaining liquid at temperatures at approximately 65° F., a solvent therefor consisting of glycerin and water, and an inert aggregate mixed with para-toluene sulphonic acid, said mortar possessing the characteristic of setting to a firm infusible material at a temperature of approximately 70° F.

4. A cement mortar comprising a binder consisting of a water-insoluble liquid phenol-formaldehyde reaction product in an arrested stage of its reaction, and having a viscosity of 25 to 70 seconds at 25° C., a solvent therefor consisting of glycerin and water, and an aggregate mixed with para-toluene sulphonic acid, said mortar possessing the characteristic of setting to a firm infusible material at approximately room temperature.

5. A cement mortar comprising a binder consisting of 75 parts by weight of a viscous liquid phenol-formaldehyde reaction product in an arrested stage of its reaction, 10 parts by weight of glycerin, and 15 parts by weight of water mixed with an aggregate and para-toluene sulphonic acid.

6. The method of producing a cement mortar comprising initiating a phenol-formaldehyde reaction and arresting the reaction while the product is in a water-insoluble liquid state, mixing said liquid reaction product with a solvent consisting of glycerin and water, and causing the mixture to set by adding thereto an aggregate mixed with para-toluene sulphonic acid and exposing the mixture to the atmosphere at room temperature.

7. The method of producing a cement mortar comprising initiating a phenol-formaldehyde reaction and arresting said reaction while the product is in a water-insoluble liquid state, and bringing the same to a temperature below room temperature, mixing therewith a solvent consisting of glycerin and water, and causing the mixture to set to a firm infusible material by mixing therewith an aggregate and para-toluene sulphonic acid while the mass is maintained below room temperature, and exposing the final mixture to the atmosphere at room temperature.

8. The method of producing a cement mortar comprising initiating a phenol-formaldehyde reaction and arresting said reaction while the product is in a liquid state and having a viscosity of 25 to 70 seconds at 25° C., mixing therewith a solvent consisting of glycerin and water, and causing the mixture to set by adding thereto an aggregate and para-toluene sulphonic acid and exposing it to the atmosphere at room temperature.

9. The method of producing a cement mortar comprising producing an incompletely-reacted phenol-formaldehyde product in liquid form, mixing the same with a solvent of glycerin and water, adding to said mixture an aggregate containing para-toluene sulphonic acid while the mixture is at a temperature of approximately 65° F. to maintain said product in its state of incompleted reaction, and completing the reaction of the phenol-formaldehyde product by exposing the mass to a temperature of approximately 70° F. until it becomes hard.

CLARON R. PAYNE.
EDWARD T. SEVERS.